(12) United States Patent
Hendey

(10) Patent No.: US 6,345,541 B1
(45) Date of Patent: Feb. 12, 2002

(54) WATER METER HAVING ADJUSTABLE FLOW CONTROL MEANS

(76) Inventor: Arthur A. Hendey, P.O. Box 529, Beaumont, CA (US) 92223

(*) Notice: Subject to any disclaimer, the term of this patent is extended or adjusted under 35 U.S.C. 154(b) by 0 days.

(21) Appl. No.: 09/406,437

(22) Filed: Sep. 27, 1999

(51) Int. Cl.[7] .................................................. G01F 1/06
(52) U.S. Cl. .................................................. 73/861.79
(58) Field of Search ........................ 73/861.79, 861.77, 73/861.75, 273; 251/208, 205

(56) References Cited

U.S. PATENT DOCUMENTS

| | | | | |
|---|---|---|---|---|
| 4,570,497 A | * | 2/1986 | Han ........................ | 73/861.79 |
| 5,341,686 A | * | 8/1994 | Chai ........................ | 73/861.33 |
| 5,365,978 A | * | 11/1994 | Woods .................... | 137/614.11 |
| 5,965,826 A | * | 10/1999 | Von Bertrab ............. | 73/861.87 |

* cited by examiner

Primary Examiner—Benjamin R. Fuller
Assistant Examiner—Cory D. Mack
(74) Attorney, Agent, or Firm—Morland C. Fischer

(57) ABSTRACT

A water meter to accurately measure the volume of water flowing from a source thereof to an end user by controlling the rate at which the water is delivered from the source to a turbine of the water meter so as to produce a smooth linear flow. The turbine is rotated within the body of the water meter to vary the alignment of flow passages through the turbine between the water source and a rotor that is responsive to water flow. The position of the turbine is selectively adjusted within the body of the water meter when a locating pin from the base of the turbine is received through a particular one of a series of indexing holes formed in a cap of the turbine. A variable water inlet orifice is formed through the bottom of the turbine to communicate with the rotor. A flow regulator that cooperates with the variable water inlet orifice is manually manipulated to control the size of the inlet orifice and the rate at which water flows therethrough.

12 Claims, 6 Drawing Sheets

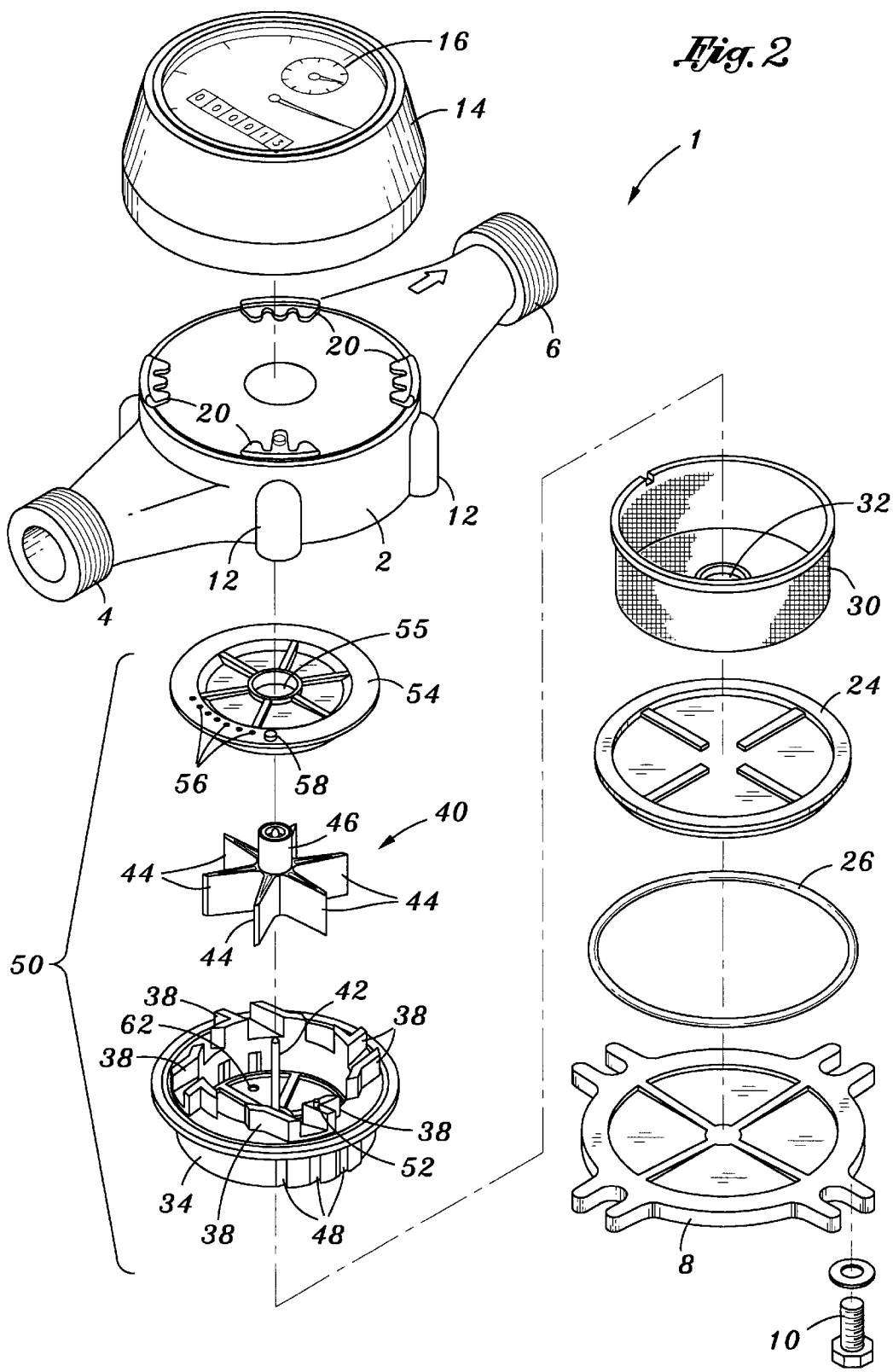

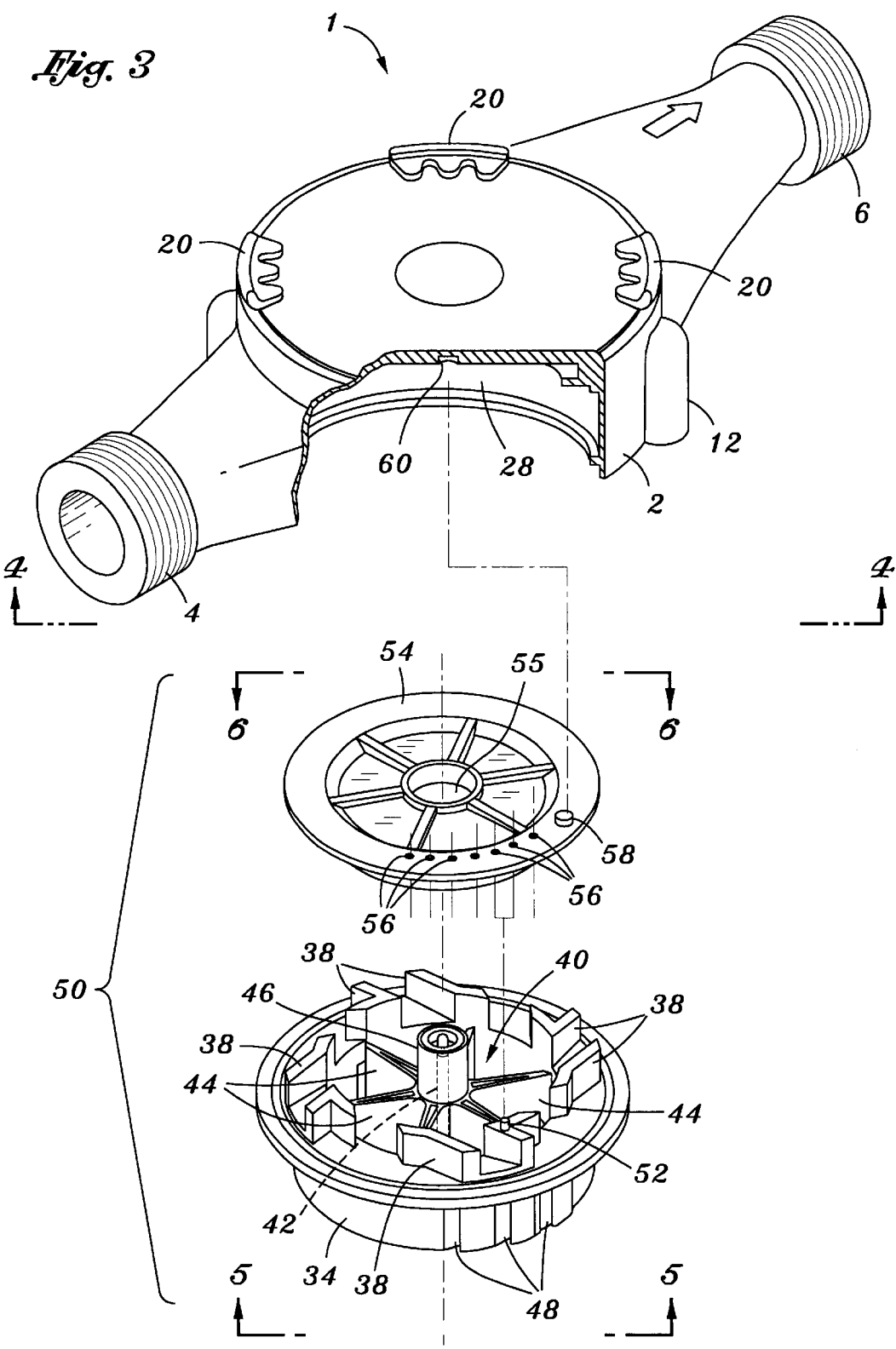

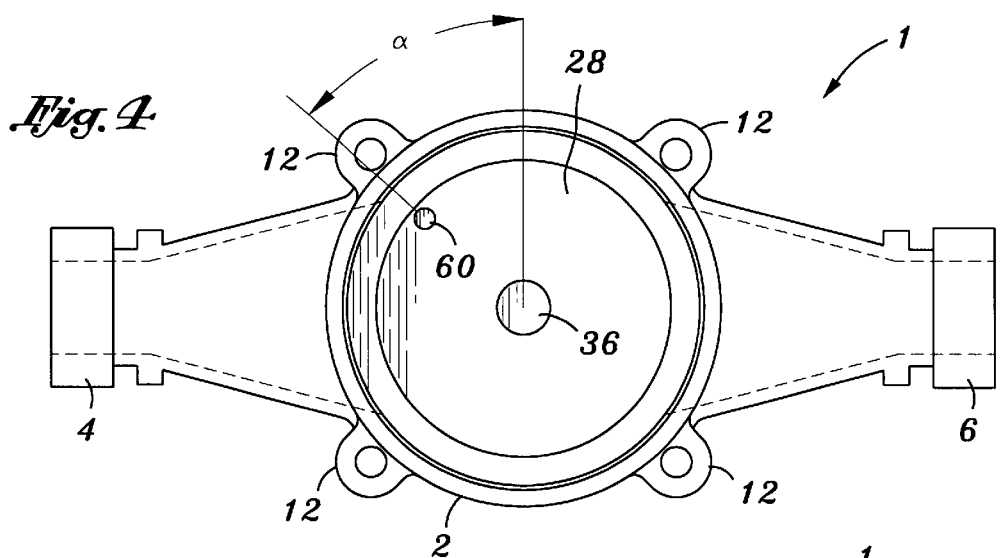
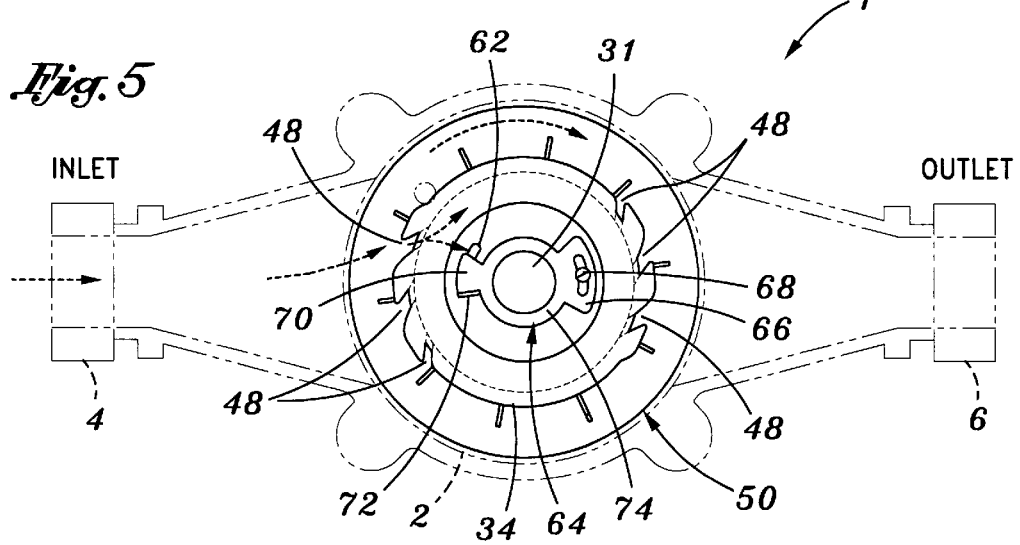
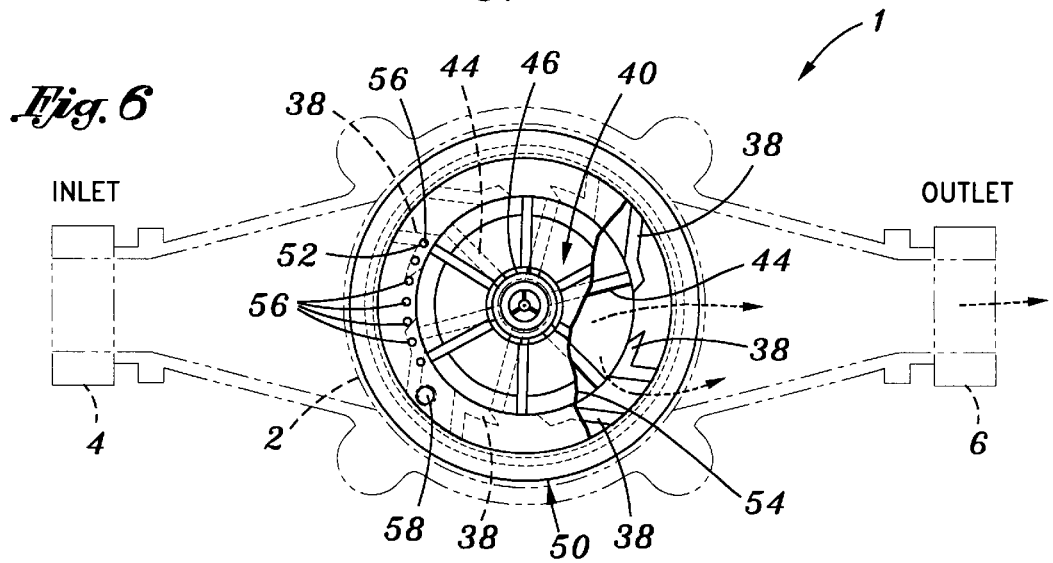

WATER METER HAVING ADJUSTABLE FLOW CONTROL MEANS

BACKGROUND OF THE INVENTION

1. Field of the Invention

This invention relates to a water meter and to means carried by a turbine in the flow path through the body of the water meter by which to adjustably control the rate at which water is delivered from a source (e.g. a water service pipe line) to the turbine in order to produce a smooth, linear flow and thereby enable the volume of water flowing through the water meter to be accurately measured.

2. Background Art

Water meters have long been employed to measure the volume of water that is taken from a source and supplied to a residence or business by way of a water service pipe line. The water meters that have theretofor been coupled to a water service pipe line are typically manufactured with a metallic body. Because the process for manufacturing a water meter is not exact, all of the metallic water meter bodies may not be identical.

In this regard, the manufacturer of the water meter has no readily available or easy means to control or adjust the flow path through the water meter body to compensate for the variations in manufacture from one water meter to another, More particularly, all of the gearing that affects the ability of the water meter to detect and read the water flow is located entirely in the register that sits above the body. If there is an irregularity in the manufacture of the water meter, the flow path through the body may be adversely affected to cause a non-linear (i.e. pulsating) water flow. In this case, there is little the manufacturer can do to smooth the water flow so as to avoid influencing the reading of the register. Consequently, some water meter registers may be undesirably susceptible to a non-linear water flow and provide readings which are not accurate. Inasmuch as large volumes of water can flow through a water meter over time, any erroneous readings by the register can lead to either significant overcharges to the water consumer or undercharges to the local municipality.

It would therefore be desirable to have an easy to use, adjustable means that can be set by the manufacturer of a water meter to cause a smooth, linear water flow through the flow path in the body of the meter to assure that the water meter register provides an accurate reading of the water that is consumed.

SUMMARY OF THE INVENTION

In general terms, a water meter is disclosed having a hollow metallic body, an inlet port to be coupled to a water service pipe line that communicates with a source of water from a local government utility, and an outlet port to be coupled to a water pipe of an end user. Located within the hollow body between the inlet and outlet ports of the water meter is a turbine. A conventional register is seated on top of the water meter. The register cooperates with the turbine to respond to and provide a visual indication of the volume of water flowing through the water meter from the source to the user. The turbine located within the hollow body of the water meter includes a cup-shaped base. Projecting upwardly from the base of the turbine is a rotor shaft, and a rotor having a series of radially projecting propeller blades is coupled to and rotatable around the rotor shaft. A series of entrance slits or passages are formed through opposite sides of the base of the turbine so as to deliver water from the inlet port to the rotor to cause the propeller blades thereof to rotate. A variable water inlet orifice is forced through the bottom of the turbine base, whereby water from the inlet port is also delivered to the rotor. A series of fins project from the turbine base to surround the rotor. The fins are angled so as to insure a proper rotation of the propeller blades in response to water delivered from the inlet port. A cap is mated to the turbine base to complete the turbine assembly with the rotor supported on the rotor shaft between the cap and the base. A protrusion is formed on the turbine cap to be received by a positioning notch within the hollow body of the water meter. The turbine is properly oriented within the hollow body of the water meter relative to the inlet and outlet ports thereof when the protrusion of the turbine cap is located in the positioning notch.

In accordance with the present invention, flow control means are carried by the turbine to control the rate at which water strikes the propeller blades of the rotor via the flow passages through the opposite sides of the turbine base the variable water inlet orifice through the bottom of the turbine base. The position of the flow passages and the size of the variable water inlet orifice are adjusted until a smooth, linear (i.e. non-pulsating) stream of water is directed from the inlet port to the rotor to enable manufacturers to compensate for irregularities in the manufacture of the water meter which could adversely affect the reading of the register. More particularly, a locating pin projects upwardly from one of the fins on the turbine base that surrounds the rotor. The turbine cap is rotated relative to the turbine base so that the locating pins is received through one of a series of indexing holes formed through the cap. Accordingly, when the turbine is oriented within the body of the water meter, the alignment of the flow passages through the turbine base can be selectively adjusted relative to the inlet orifice depending upon the particular indexing holes in which the locating pin is received. In this same regard, a flow regulator is attached to the bottom of the turbine base by which the size of the variable water inlet orifice can be selectively adjusted. The flow regulator includes a finger tab that is manually manipulated to position the flow regulator to cover some or all of the variable water inlet orifice. The position adjustable flow passages and the size adjustable water inlet orifice cooperate with one another so that the water meter can be fine tuned to achieve a linear water flow through the turbine and an accurate reading by the register.

BRIEF DESCRIPTION OF THE DRAWINGS

FIG. 2 is an exploded view of the water meter of FIG. 1 showing a turbine having adjustable flow control means which form the present invention;

FIG. 3 is a detailed enlargement of the turbine and the flow control means as shown in FIG. 2;

FIG. 4 shows a hollow interior chamber of the water meter within which the turbine of FIG. 2 and 3 is housed;

FIGS. 5 and 6 illustrate the flow control means of the turbine at a first setting to maximize the rate at which water is delivered from the source to the turbine;

DETAILED DESCRIPTION

Figure 1:
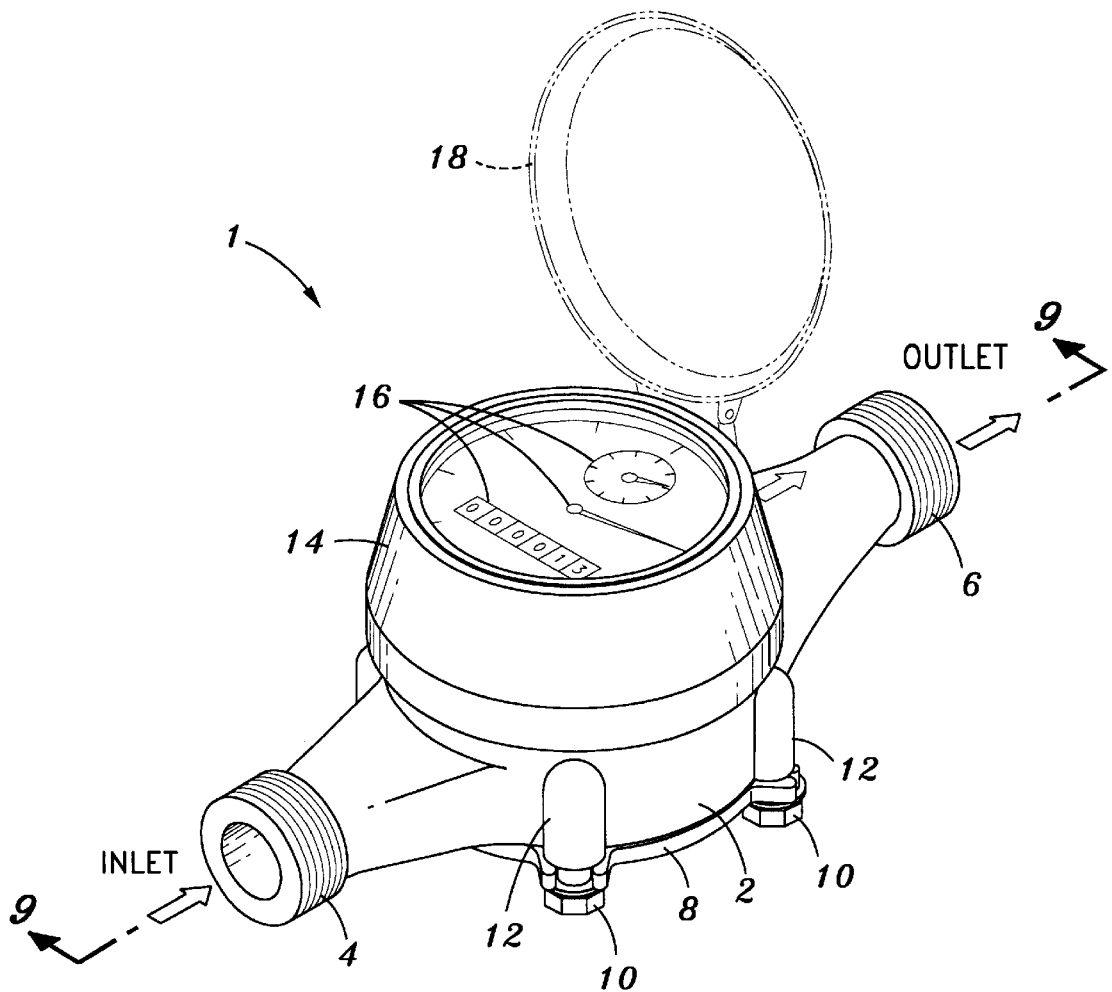
FIG. 1 shows a water meter having a register seated thereon to measure and indicate the volume of water flowing from a source to which the water meter is coupled.

The water meter 1 which forms the present invention is initially described while referring to FIG. 1 of the drawings.

The water meter 1 has a metallic (e.g. steel) body 2 in which a turbine (designated 50 and best shown in FIGS. 2 and 3) is housed. The body 2 of water meter 1 has a water inlet port 4 and a water outlet port 6 that establish a flow path (best shown in FIG. 9) through the turbine 50 within body 2. Inlet and outlet ports 4 and 6 are threaded to facilitate their being coupled between a correspondingly threaded (water service pipe line and a water pipe to supply water from a source thereof (e.g. a reservoir that is maintained by a local government utility) to any of a residence, a small business center, an irrigation system, a car wash, and the like.

To gain access to the turbine 50 within the water meter 1, a cover plate 8 is removably connected to the bottom of the body 2 by means of fasteners 10 that extend through holes in cover plate 8 for receipt by respective sockets 12. Seated on and detachably connected to the top of the body 2 is a register 14. The register 14 is a conventional electromagnetically controlled metering device and is shown in FIG. 1 with an analog display 16 to indicate and record the volume of water, in cubic feet, that passes through the turbine 50 within the body 2 of meter 1. A lid 18 is pivotally coupled to register 14. The lid 18 is rotated off the register 14 when the water meter 1 receives a supply of water to be measured and it becomes necessary to have visible access to the display 16.

An exploded view of the water meter 1 of FIG. 1 and the turbine 50 that is housed within the body 2 are illustrated in FIGS. 2 and 3 of the drawings. Located at the top of the body 2 of water meter 1 is a set of (e.g. four) locking tabs 20. In the assembled configuration of FIG. 1, the locking tabs are mated to a corresponding set of catches (shown in broken lines in FIG. 9 and designated 22) of the register 14 whereby to detachably connected register 14 to the top of body 2.

Access to the turbine 50 located within water meter 1 is available by first removing the fasteners 10 and separating the cover plate 8 from the bottom of the body 2. Next, a disk-like closure 24 having a rubber sealing ring 26 extending around the periphery thereof is lifted off the body 2 to expose a hollow interior chamber of the water meter (designated 28 in FIG. 3) within which the turbine 50 is housed. The turbine 50 is preferably manufactured from a non-metallic (e.g. plastic) material and is enclosed by a perforated, non-metallic basket or strainer 30. The strainer 30 includes a centering hole 32 that is sized to receive a nub (designated 31 in FIG. 9) that projects downwardly from the bottom of a hollow cup-shaped base 34 of turbine 50.

Figure 9:
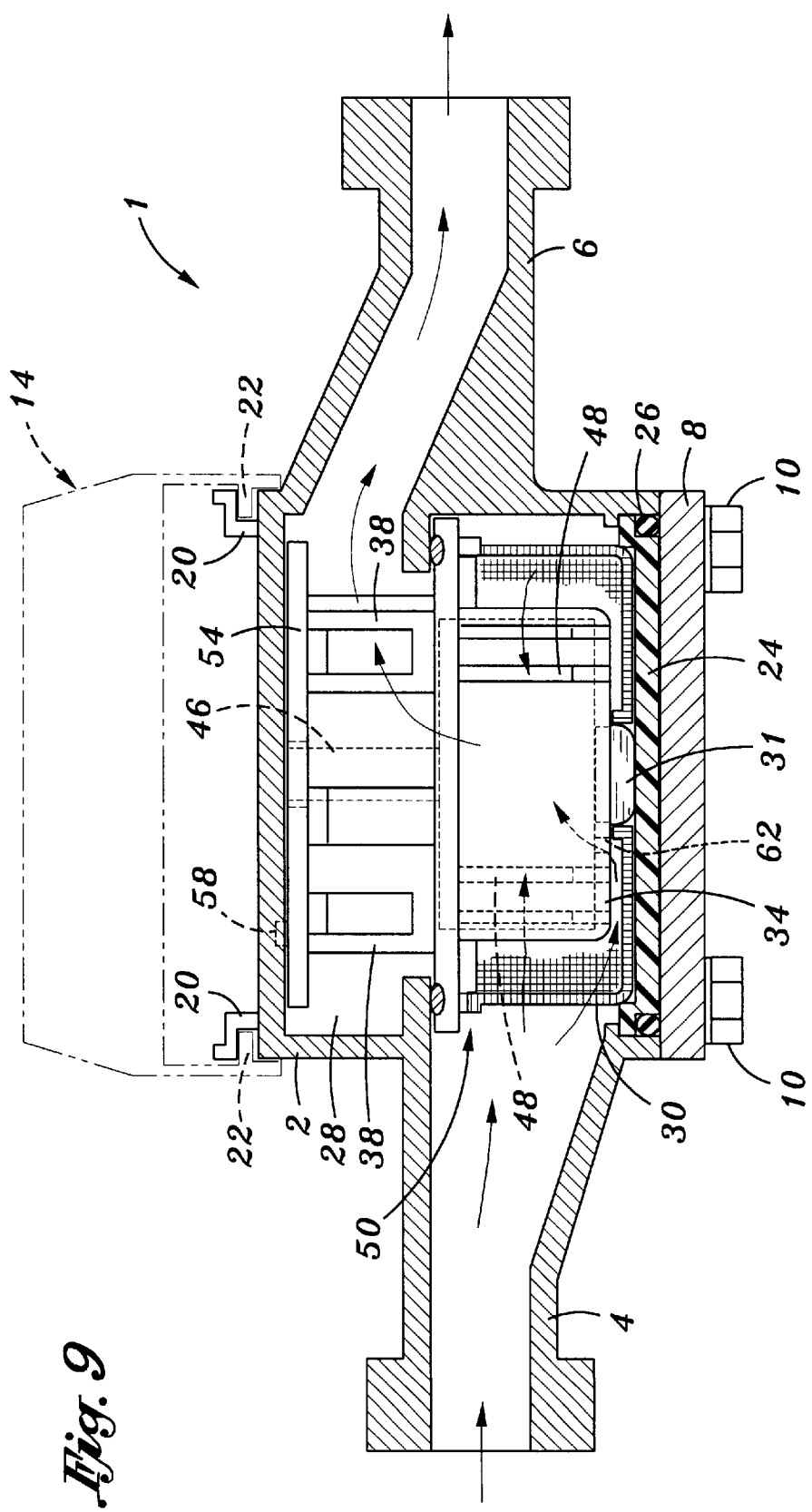
FIG. 9 is a cross section of the water meter of FIG. 1 showing the flow path through the turbine.

A series of fins 38 depend upwardly from and around the periphery of the base 34 of turbine 50. As is best shown in FIG. 9, with the turbine 50 located inside the hollow chamber 28 of water meter 1, the fins 38 of the turbine base 34 will lie in the flow path between the water inlet port 4 and the rotor 40 of turbine 50. The fins 38 are angled in different directions to direct the flow of water from the inlet port 4 to the rotor 40. To this end, a rotor shaft 42 projects upwardly from the bottom of the turbine base 34 in coaxial alignment with the series of fins 38. The rotor 40 has a plurality of uniformly spaced propeller blades 44 that project radialy outward from a rotor hub 46. The rotor hub 46 is hollow so that in the assembled rotor configuration of FIG. 3, the hub 46 of rotor 40 is mounted on and surrounds the rotor shaft 42, whereby the rotor 40 will rotate within the hollow base 34 of turbine 50 in response to a steam of water from a source thereof (e.g. a water service pipe line) that is received through inlet port 4. The fins 38 insure that the propeller blades 44 always spin in the same direction around the rotor shaft 42 in response to the water received through inlet port 4. The turbine 50 is centered within the hollow chamber 28 in the body 2 of water meter 1 when the hub 46 of rotor 40 is captured by a small depression (designated 36 and best shown in FIG. 4) that is formed underneath the top of the body 2).

A series of entrance slits or passages 48 are molded into opposite sides of the base 34 of turbine 50 so as to be disposed below the fins 38. The passages 48 lie in the flow path between the inlet and outlet ports 4 and 6 of the water meter 1 so as to direct the stream of water from the source to the propeller blades 44 and thereby cause the rotor 40 of turbine 50 to rotate within the hollow turbine base 34 at the interior of hollow chamber 28. In the assembled configuration of FIG. 9, the turbine base 34 is surrounded by the strainer 30 so that the passages 48 are located inside the strainer 30 while the fins 38 at the top of the base 34 are located above the strainer 30.

As an important feature of this invention, a locating pin 52 projects upwardly from one of the fins 38 at the top of turbine base 34. The advantage of locating pin 52 for controlling the flow of water to the turbine 50 will soon be described.

Turbine 50 also includes a disk-like cap 54 that rests on top of the fins 38 which project upwardly from the turbine base 34. An opening 55 is formed through the cap 54 to accommodate the hub 46 of rotor 40 so that hub 46 can be captured by the depression 36 (of FIG. 4) formed underneath the top of body 2 of water meter 1. As another important feature of this invention, a series of uniformly spaced indexing holes 56 are formed through cap 54. As will be described in greater detail hereinafter, the locating pin 52 from the turbine base 34 is received through a particular one of the indexing holes 56 of cap 54 so that the alignment of the passages 48 through the base 34 of turbine 50 can be selectively adjusted within the hollow chamber 28 of water meter 1 relative to water inlet port 4 of body 2. In this regard, a small protrusion 58 projects upwardly from the turbine cap 54. In the assembled configuration of FIG. 9, the protrusion 58 is received within a positioning notch 60 (best shown in FIGS. 3 and 4) that is formed underneath the top of the body 2 of water meter 1 to prevent an inadvertent displacement (i.e. rotation) of the turbine 50 within the hollow chamber 28.

FIG. 5 of the drawings shows another important feature of the present invention. More particularly, a variable water inlet orifice 62 is formed through the bottom of the base 34 of the turbine 50. With the addition of inlet orifice 62, water received through the inlet port 4 of water meter 1 will be supplied to the turbine 50 (of FIG. 2) by way of the entrance slits or passages 48 formed through the opposite sides of the turbine base 34 within which the rotor 40 is located as well as the inlet orifice 62 through the bottom of the turbine base 34. The size of the variable inlet orifice 62 is selectively adjusted by means of a flow regulator 64.

Flow regulator 64 includes a first end 66 that is secured to the bottom of the turbine base 34 by a small fastener (e.g. a screw 68). The opposite end 70 of flow regulator 64 is adapted to slide over and close some or all of inlet orifice 62 to control the rate at which the water flows through orifice 62 to the rotor 40 of turbine 50. To this end, a finger tab 72 projects from the second end of flow regulator 64 to which a pushing force can be manually applied to adjust the position of the second end 70 relative to the variable water inlet orifice 62. Flow regulator 64 includes a center ring 74 located between the first and opposite ends 66 and 70 thereof and sized to surround the nub 31 that projects from the bottom of the turbine base 34.

When the screw 68 that holds the first end 66 of the flow regulator 64 to the bottom of the turbine base 34 is loosened, a pushing force may be applied to the finger tab 72 at the second end 70. Accordingly, the center ring 74 of the flow regulator 64 is caused to rotate around the nub 31, whereby the second end 70 of flow regulator 64 will slide in either a clockwise or counterclockwise direction along the bottom of the base 34 depending upon whether it is desirable to increase or decrease the effective size of the variable water inlet orifice 62. Once the appropriate size of inlet orifice 62 has been determined, the screw 68 is tightened to secure the position of the flow regulator 64 against the turbine base 34.

In accordance with the improvement of this invention, it has been found that the ability to selectively control the velocity of the water that enters the water meter 1 and strikes the blades 44 of the rotor 40 within the turbine base 34 enables the manufacturer of meter 1 to eliminate pulsations in the water flowing from the water source to turbine 50 so that the register (designated 14 in FIGS. 1 and 2) of water meter 1 can more reliably measure the water flow relative to conventional water meters. In particular, adjusting the velocity of the water that is received by the rotor 40 through the passages 48 in the sides of the turbine base 34 and through the water inlet orifice 62 in the bottom of the turbine base 34 has proven to smooth out the stream of water against the propeller blades 44 of the rotor 40 so that any non-linear (i.e. choppy) water flowing through inlet port 4 will not adversely effect the reading of register 14.

FIG. 5 of the drawings shows the flow regulator 64 located in a first position on the bottom of the turbine base 34 so that the variable water inlet orifice 62 is fully open. Therefore, the velocity of the water being delivered via inlet orifice 62 to rotor 40 of turbine 50 will be maximized.

FIG. 6 of the drawings shows the cap 54 of the turbine 50 positioned (i.e. rotated) relative to the turbine base 34 so that the locating pin 52 (best shown in FIGS. 2 and 3) that projects from one of the fins 38 of the turbine base 34 is received through one (e.g. the first) of the indexing holes 56 through the turbine cap 54. Hence, when the turbine 50 is oriented within the water meter 1 (with the protrusion 58 of turbine cap 54 captured by the positioning notch 60 underneath the top of body 2), the passages 48 through the sides of the turbine base 34 will be correspondingly oriented relative to the water inlet port 4 of meter 1. In the case of FIGS. 5 and 6, all of the passages 48 through one side of turbine base 34 are oriented in full facing alignment with inlet port 4 so that the velocity of the water being delivered to the rotor 40 of turbine 50 will be maximized.

Figure 7:
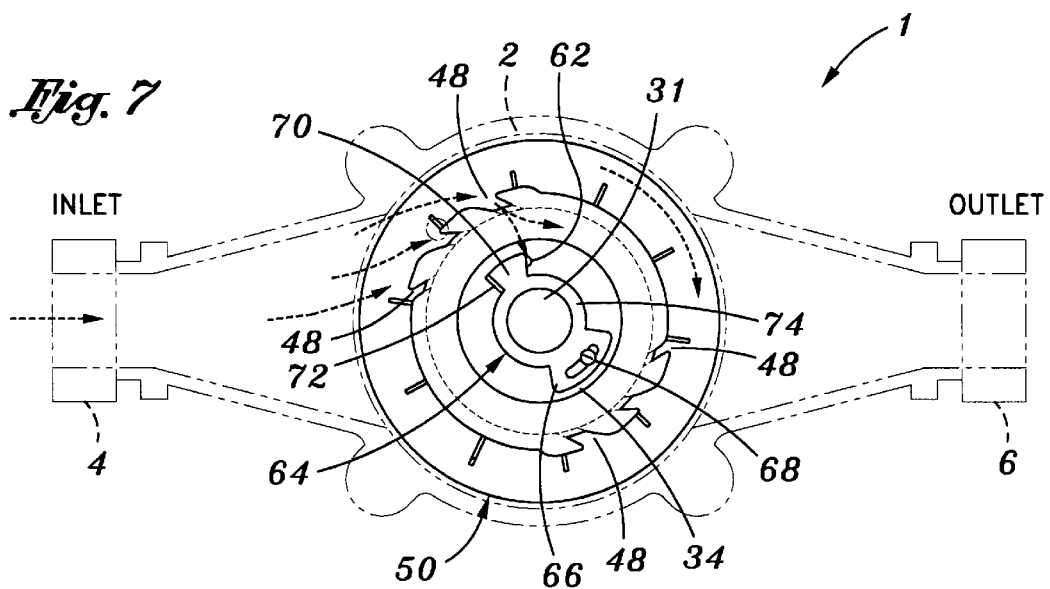
FIGS. 7 and 8 illustrate the flow control means of the turbine at a second setting to minimize the rate at which water is delivered from the source to the turbine.

FIG. 7 of the drawings shows the flow regulator 64 located in a second position on the bottom of the turbine base 34 so that the variable water inlet orifice 62 is now almost completely closed. Therefore, the velocity of the water being delivered via inlet orifice 62 to the rotor 40 of turbine 50 will be minimized. It is to be understood that the flow regulator 64 may be pushed (by means of the finger tab 72) into any other position between the first and second positions described above so as to control the size of the variable water inlet orifice 62 and thereby tailor the velocity of the water traveling through inlet orifice 62 to the particular velocity that will eliminate pulsations in the stream of water being delivered from the water source to the rotor 40 of turbine 50.

Figure 8:
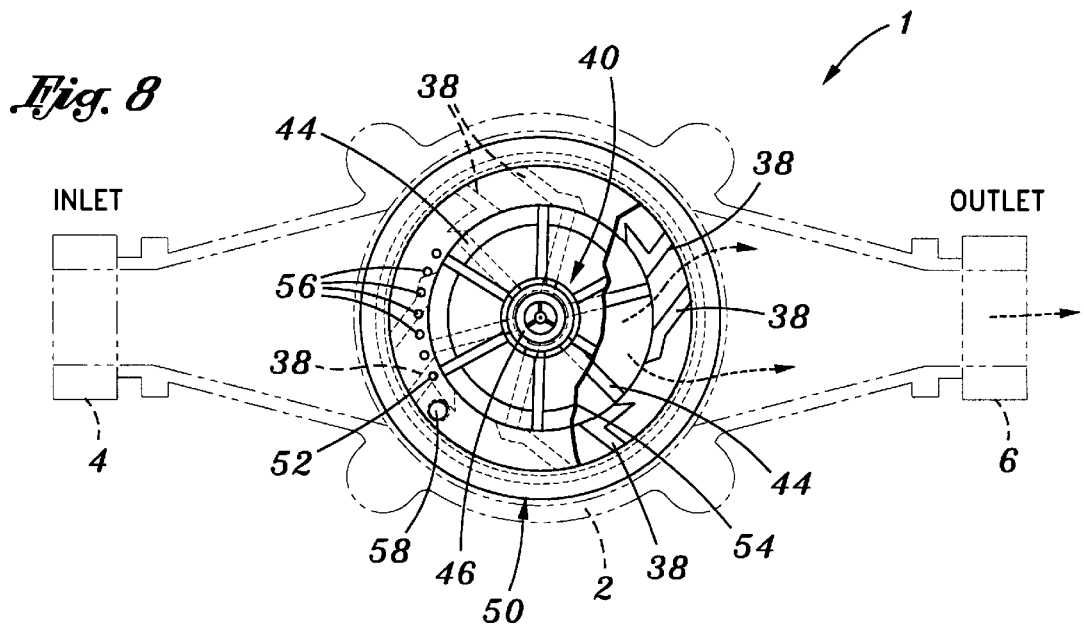

FIG. 8 of the drawings shows the cap 54 of the turbine 50 rotated relative to the turbine base 34 so that the locating pin 52 is now received in another (e.g. the last) of the indexing holes 56 through cap 54. Hence, when the protrusion 58 of turbine cap 54 is captured by the positioning notch 60 to orient and the turbine 50 within the water meter 1, the turbine will now have been rotated within the body 2 of meter 1 and, therefore, the passages 48 through the sides of the turbine 34 will be correspondingly rotated relative to the water inlet port 4. It may be appreciated that the angle of rotation of the turbine 50 within the body 2 of meter 1 as well as the passages 48 of turbine body 34 relative to the water inlet port 4 will be identical to the angle of rotation of the turbine cap 54 relative to the turbine base 34 when the locating pin 52 is repositioned from the first to the last indexing hole 56 as shown in FIG. 8. However, in the case of FIGS. 7 and 8, the passages 48 through one side of the turbine base 38 have been shifted to one side of the water inlet port 4 so that the velocity of the water being delivered to the rotor 40 of turbine 50 via passages 48 will be minimized.

It is also to be understood that the turbine cap 54 can be rotated through any angle so that the locating pin 52 can be received by any of the other indexing holes 56 between the first and the last holes as described above in order to control the position of the passages 48 relative to the water inlet port 4. In this manner, the velocity of the water travelling through the passages 48 can be tailored to the particular velocity that will eliminate pulsations in the stream of water that is delivered to the rotor 40 of turbine 50 so that the volume of water flowing through the flow path of the particular water meter 1 shown in FIG. 9, including inlet and outlet ports 4 and 6, passages 48 in opposite sides of the turbine base 34, and the rotor 40 of turbine 50, can be accurately measured.

It is to be understood that the flow control means (i.e. indexing holes 56 and flow regulator 64) that have been described above for controlling the rate of water flow through the passages 48 in the sides of turbine base 34 and the water inlet orifice 62 in the bottom of the turbine base 34 cooperate with one another to achieve the ideal velocities that are required to smooth out the stream of water being delivered to the turbine 50 to cause the propeller blades 44 of rotor 40 to rotate. That is to say, following the manufacture of the water meter 1, the manufacturer will try the locating pin 52 in different indexing holes 56 of turbine cap 54 until the pulsations in the water stream are minimized. At this time, the flow regulator 64 can be moved to different positions relative to the water inlet orifice 62 to fine tune the water flow so that a substantially constant or linear stream of water will be directed against the rotor 40 of turbine 50, whereby to enable the register 14 (of FIG. 1) to provide an accurate reading of the volume of water that is conducted through the water meter 1. Accordingly, when the water meter 1 is coupled to a water service pipe line (or any other suitable water source), a more reliable reading is likely than with conventional water meters that are more susceptible to variations in manufacture and to pulsations in the water flow.

What is claimed is:
1. A water meter to measure the flow of water from a water source, said water meter comprising:
   a hollow body having an inlet port to be coupled to the water source to receive a supply of water therefrom and an outlet port through which the supply of water is delivered to a user;
   a turbine located within said hollow body and having an entrance passage formed therein and aligned with said inlet port in order to receive the supply of water from the source by way of said inlet port, said turbine including a rotor responsive to the supply of water received through said inlet port so as to provide an indication of the amount of water flowing through said hollow body between said inlet and outlet ports thereof;

adjustable flow control means to control the rate at which the supply of water is received by said rotor through the entrance passage in said turbine by way of said inlet port; and a variable water inlet orifice formed through said turbine and aligned with said rotor, and a flow regulator adapted to be displaced relative to said variable water inlet orifice to change the size of said variable water inlet orifice and thereby control the rate at which the supply of water is received by said rotor through said inlet orifice by way of said inlet port.

2. The water meter recited in claim 1, wherein said turbine has a protrusion projecting therefrom and said hollow body has a positioning notch forced therein, said protrusion received by said positioning notch so as to position said turbine within said hollow body relative to said inlet port thereof.

3. The water meter recited in claim 2, said turbine also including a base to enclose said rotor and a cap detachably connected to said turbine base, said entrance passage being formed through said turbine base, and said turbine base having a rotor shaft extending therefrom to support said rotor for rotation within said turbine base in response to the supply of water received from the source, said turbine cap having said protrusion projecting therefrom to be received by said positioning notch.

4. The water meter recited in claim 3, wherein said adjustable flow control means includes means to change the position of said turbine base relative to said turbine cap, whereby to correspondingly change the alignment of said entrance passage formed in said turbine base relative to said inlet port.

5. The water meter recited in claim 4, wherein said turbine cap includes a series of indexing holes formed therein and said turbine base includes a locating pin extending therefrom, said locating pin being received through different ones of said series of indexing holes to change the alignment of said entrance passage in said turbine base with said inlet port depending upon the particular one of said series of indexing holes in which said indexing pin is received.

6. A water meter to measure the flow of water from a water source, said water meter comprising:

a hollow body having an inlet port to be coupled to the water source to receive a supply of water therefrom, an outlet port through which the supply of water is delivered to a user, and a positioning notch; and a turbine located within said hollow body to receive the supply of water from the source by way of said inlet port, said turbine including a rotor, a base to surround said rotor, a rotor shaft extending from said base to support said rotor for rotation in response to the supply of water received from the source so as to provide an indication of the amount of water flowing through said hollow body between said inlet and outlet ports thereof, a protrusion for receipt by the positioning notch formed in said hollow body so as to position said turbine within said hollow body, and an entrance passage formed in said turbine base to be aligned with said inlet port so that the supply of water from the source communicates with said rotor by way of said entrance passage in said turbine base, the position of said entrance passage relative to said inlet port being adjustable to control the rate at which the supply of water is received by said rotor by way of said inlet port and said entrance passage.

7. The water meter recited in claim 6, said turbine also including a cap detachably connected to said turbine base, said protrusion projecting from said turbine cap for receipt by the positioning notch of said hollow body.

8. The water meter recited in claim 7, wherein the position of said turbine base is adjustable relative to said turbine cap whereby to correspondingly adjust the alignment of said entrance passage in said turbine base relative to said inlet port.

9. The water meter recited in claim 8, said turbine also including a series of indexing holes formed through said turbine cap and a locating pin extending from said turbine base, said locating pin being received through different ones of said series of indexing holes to change the position of said turbine base relative to said turbine cap and thereby adjust the alignment of said entrance passage in said turbine base with said inlet port depending upon the particular one of said series of indexing holes in which said indexing pin is received.

10. The water meter recited in claim 6, said turbine also including a variable water inlet orifice formed through said turbine base and aligned with said rotor surrounded by said turbine base, and a flow regulator to change the size of said variable water inlet orifice.

11. The water meter recited in claim 10, wherein said flow regulator is adapted to slide along said turbine base relative to said variable water inlet orifice formed through said turbine base to change the size of said variable water inlet orifice depending upon the position of said flow regulator.

12. A water meter to measure to flow of water from a water source, said water meter comprising:

a hollow body having an inlet port to be coupled to the water source to receive a supply of water therefrom, an outlet port through which the supply of water is delivered to a user, and a positioning notch;

a turbine located within said hollow body to receive the supply of water from the source by way of said inlet port, said turbine including a rotor, a base to surround said rotor, a rotor shaft extending from said base to support said rotor for rotation in response to the supply of water received from the source so as to provide an indication of the amount of water flowing through said hollow body between said inlet and outlet ports thereof a cap connected to said base and having a protrusion projecting therefrom for receipt by the positioning notch of said hollow body so as to position said turbine within said hollow body relative to the inlet port thereof; and adjustable water flow control means to control the rate at which the supply of water is received by the rotor of said turbine by way of said inlet port.

* * * * *